(12) United States Patent
Enders

(10) Patent No.: US 11,377,092 B2
(45) Date of Patent: Jul. 5, 2022

(54) METHOD FOR DETERMINING THE BITING POINT OF A HYBRID DISCONNECT CLUTCH OF A HYBRID VEHICLE

(71) Applicant: Schaeffler Technologies AG & Co. KG, Herzogenaurach (DE)

(72) Inventor: Timo Enders, Bensheim (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/297,687

(22) PCT Filed: Nov. 5, 2019

(86) PCT No.: PCT/DE2019/100954
§ 371 (c)(1),
(2) Date: May 27, 2021

(87) PCT Pub. No.: WO2020/114544
PCT Pub. Date: Jun. 11, 2020

(65) Prior Publication Data
US 2022/0025942 A1 Jan. 27, 2022

(30) Foreign Application Priority Data
Dec. 3, 2018 (DE) .......................... 102018130679.2

(51) Int. Cl.
*B60W 20/40* (2016.01)
*F16D 48/06* (2006.01)
(Continued)

(52) U.S. Cl.
CPC ............ *B60W 20/40* (2013.01); *B60W 10/02* (2013.01); *B60W 10/08* (2013.01); *F16D 48/06* (2013.01);
(Continued)

(58) Field of Classification Search
CPC ............................................. F16D 2500/50263
See application file for complete search history.

(56) References Cited

U.S. PATENT DOCUMENTS

| 2015/0307087 A1 | 10/2015 | Eo | |
| 2017/0343064 A1* | 11/2017 | Lienhard | ................. F16D 48/06 |
| 2018/0001884 A1 | 1/2018 | Itagaki et al. | |

FOREIGN PATENT DOCUMENTS

| CN | 102310853 A | 1/2012 |
| CN | 104052246 A | 9/2014 |

(Continued)

*Primary Examiner* — Timothy Hannon
(74) *Attorney, Agent, or Firm* — Nathan Smith

(57) ABSTRACT

A method determines the biting point of a hybrid disconnect clutch of a hybrid vehicle. The hybrid disconnect clutch disconnects or connects an internal combustion engine and a first electric motor, which is arranged on the output side. A second electric motor, which is arranged on the internal combustion engine side and is rigidly connected to the internal combustion engine, is operated at a constant rotational speed during electric travel by means of the first electric motor. The hybrid disconnect clutch is moved from the open state toward the closed state and the load on the second electric motor is monitored. When the load on the second electric motor reaches a predefined load threshold value, it is determined that the biting point has been reached.

12 Claims, 2 Drawing Sheets

(51) Int. Cl.
  *B60W 10/08* (2006.01)
  *B60W 10/02* (2006.01)
(52) U.S. Cl.
  CPC ............... *B60W 2510/0216* (2013.01); *B60W 2510/081* (2013.01); *B60W 2710/083* (2013.01); *F16D 2500/30421* (2013.01); *F16D 2500/30426* (2013.01); *F16D 2500/50251* (2013.01); *F16D 2500/50281* (2013.01)

(56) References Cited

FOREIGN PATENT DOCUMENTS

| | | | |
|---|---|---|---|
| CN | 105465296 A | 4/2016 | |
| CN | 106662176 A | 5/2017 | |
| DE | 102008027071 A1 | 1/2009 | |
| DE | 102008030473 A1 | 1/2009 | |
| DE | 102012204929 A1 | 10/2012 | |
| DE | 102015218691 A1 | 4/2016 | |
| DE | 102015216071 A1 | 3/2017 | |
| DE | 102015222690 A1 | 5/2017 | |
| DE | 102018107979 A1 | 8/2019 | |
| DE | 102018126881 A1 | 4/2020 | |
| EP | 2480439 A1 | 8/2012 | |
| TW | 1271342 B | 1/2007 | |
| WO | 2015008132 A1 | 1/2015 | |
| WO | 2016008463 A1 | 1/2016 | |

\* cited by examiner

METHOD FOR DETERMINING THE BITING POINT OF A HYBRID DISCONNECT CLUTCH OF A HYBRID VEHICLE

CROSS-REFERENCE TO RELATED APPLICATIONS

This application is the U.S. National Phase of PCT Appln. No. PCT/DE2019/100954 filed Nov. 5, 2019, which claims priority to DE 102018130679.2 filed Dec. 3, 2018, the entire disclosures of which are incorporated by reference herein.

TECHNICAL FIELD

The disclosure relates to a method for determining the biting point of a hybrid disconnect clutch of a hybrid vehicle, in which method the hybrid disconnect clutch disconnects or connects an internal combustion engine and a first electric motor, which is arranged on the output side, and the torque output by the internal combustion engine and/or the first electric motor is transferred to drive wheels of the hybrid vehicle, the hybrid disconnect clutch being moved from an open state into a closed state in order to determine the biting point.

BACKGROUND

In order for a clutch to be operated automatically by an actuator, a clutch characteristic must be stored in the software. This clutch characteristic changes with the operation of the hybrid disconnect clutch and must therefore be permanently adapted with the corresponding software functions. This includes a biting point adaptation with which a clutch characteristic stored in the software is adapted. If the clutch characteristic is not correct, another incorrect torque is transmitted at a certain actuator position.

WO 2016/008463 A1 discloses a method for determining a biting point change of a hybrid disconnect clutch of a hybrid vehicle, in which a rotational speed gradient of the internal combustion engine is determined. The hybrid disconnect clutch is moved during operation of the internal combustion engine with a constant torque of the internal combustion engine until a predefined torque is transmitted by the hybrid disconnect clutch and the biting point is corrected as a function of the rotational speed gradient of the internal combustion engine.

From the as yet unpublished German patent application of the applicant with the file reference 10 2018 126 881.5, a hybrid module in a powertrain is known, which has a first electric motor which is arranged on the output side and a second electric motor which is arranged on the internal combustion engine side, which are separated by a disconnect clutch.

Such so-called twin-drive concepts make it possible to drive purely electrically over a longer period of time. However, the biting point cannot be determined during this period because the internal combustion engine is not being operated.

SUMMARY

It is desirable to devise a method in which, in the case of twin drive concepts, the biting point can be determined at any point in time during travel of the hybrid vehicle.

A second electric motor, which is arranged on the internal combustion engine side and is rigidly connected to the internal combustion engine, is operated at a constant rotational speed during electric travel by means of the first electric motor. The hybrid disconnect clutch is moved from the open state toward the closed state and the load on the second electric motor is monitored. It is detected that the biting point has been reached when the load on the second electric motor has reached a predefined threshold value. This has the advantage that the biting point adaptation can also take place if the hybrid vehicle drives electrically for a longer period of time. This ensures that the clutch characteristic can also be continuously adapted in such a driving situation and is therefore always adapted to the predefined conditions.

The unfired internal combustion engine is advantageously kept by the second electric motor at a constant rotational speed of the second electric motor. The second electric motor generates the drag torque with which the internal combustion engine is set in an external rotary motion.

In one embodiment, the constant rotational speed of the internal combustion engine and of the second electric motor is set by regulating the rotational speed of the second electric motor. This rotational speed control has the advantage that it sets both the rotational speed of the internal combustion engine and the rotational speed of the second electric motor, whereby additional control electronics for the internal combustion engine can be dispensed with. This reduces the costs for the proposed method.

In one variant, in order to determine the biting point, an amount of a rotational speed difference between the first electric motor and the second electric motor/internal combustion engine is formed and compared with a predefined rotational speed threshold. Only when the rotational speed threshold is exceeded is the internal combustion engine dragged along by the second electric motor. The rotational speed difference can be positive or negative.

In a further development, a torque of the second electric motor is monitored as the load. Due to the influence of the closing hybrid disconnect clutch on the rotational speed of the second electric motor, the biting point can be reliably deduced.

The hybrid disconnect clutch is advantageously operated in the form of a ramp in the closing direction. This ensures that the closure of the hybrid disconnect clutch is also reliably set.

In a further embodiment, the biting point is determined by a position of the hybrid disconnect clutch, at which the load on the second electric motor exceeds the predefined load threshold value. By means of this biting point, a system-specific internal clutch characteristic is adapted, so that the clutch actuator always sets the desired clutch torque when the hybrid disconnect clutch is operated.

BRIEF DESCRIPTION OF THE DRAWINGS

An embodiment will be explained in more detail with reference to the figures shown in the drawing, In the drawings.

DETAILED DESCRIPTION

Figure 1:
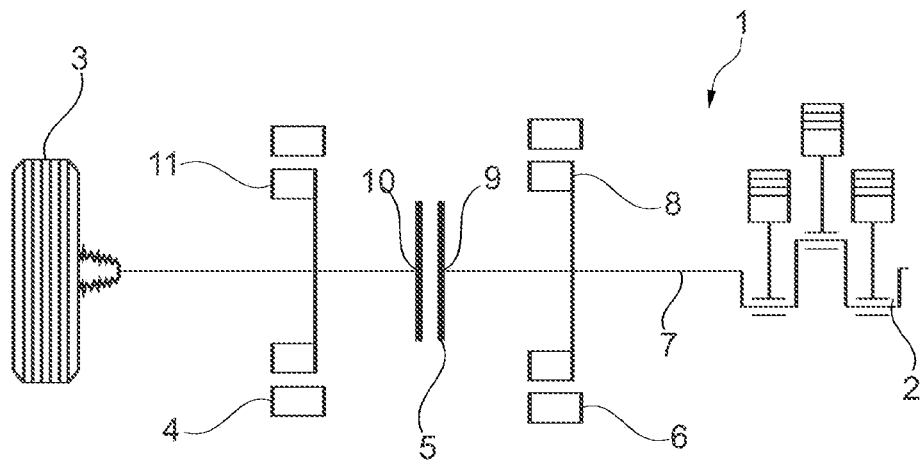
FIG. 1 shows an exemplary embodiment of a powertrain of a hybrid vehicle for carrying out the method.

FIG. 1 shows an exemplary embodiment of the hybrid powertrain of a vehicle. In this hybrid powertrain 1, a first electric motor 4 is arranged between an internal combustion engine 2 and an output 3, which is represented by vehicle wheels, which electric motor is arranged on the output side and can provide a first drive torque. The first electric motor 4 is coupled via the hybrid disconnect clutch 5 to a second electric motor 6, which in turn is rigidly connected to the internal combustion engine 2. A crankshaft 7 of the internal combustion engine 2 is connected to a rotor 8 of the second electric motor 6 in a rotationally fixed manner. The second electric motor 6 and the internal combustion engine 2 can be connected together with the output 3. The second electric motor 6 and the internal combustion engine 2 are connected to a clutch input 9 of the hybrid disconnect clutch 5. When the hybrid disconnect clutch 5 is closed, the second electric motor 6 can transmit the second drive torque and the internal combustion engine 2 can transmit the third drive torque to the output 3 together.

A first electric motor 4, which provides a first drive torque, is connected to a clutch output 10 of the hybrid disconnect clutch 5. The first electric motor 4 has a rotor 11 which is non-rotatably connected to the clutch output 10 and is also connected to the output 3.

The first electric motor 4, the second electric motor 6 and the internal combustion engine 2 are connected in series and the hybrid disconnect clutch 5 is operatively arranged between the first electric motor 4 and the internal combustion engine 2 as well as between the first electric motor 4 and the second electric motor 6. If the hybrid disconnect clutch 5 is closed, the first electric motor 4 can deliver the first drive torque and the second electric motor 6 can deliver the second drive torque to the output 3. Whether the internal combustion engine 2 provides the third drive torque and also delivers it to the output 3 when the hybrid disconnect clutch 5 is closed depends on the rotational speed of the internal combustion engine 2.

When at least the second electric motor 6 provides the second drive torque, the internal combustion engine 2 rotates at a first rotational speed. If the first rotational speed is below an idling speed of the internal combustion engine 2, the internal combustion engine 2 runs freely and is dragged along. There is a drag torque of the internal combustion engine 2, which counteracts the second drive torque.

When the first rotational speed corresponds to or is above an idling speed of the internal combustion engine 2, the internal combustion engine 2 is actively operated and provides the third drive torque. The third drive torque adds up together with the first drive torque and, if the second electric motor 6 is also operated, with the second drive torque to a total drive torque that is present at the output 3 for driving the hybrid vehicle when the hybrid disconnect clutch 5 is closed.

Figure 2:
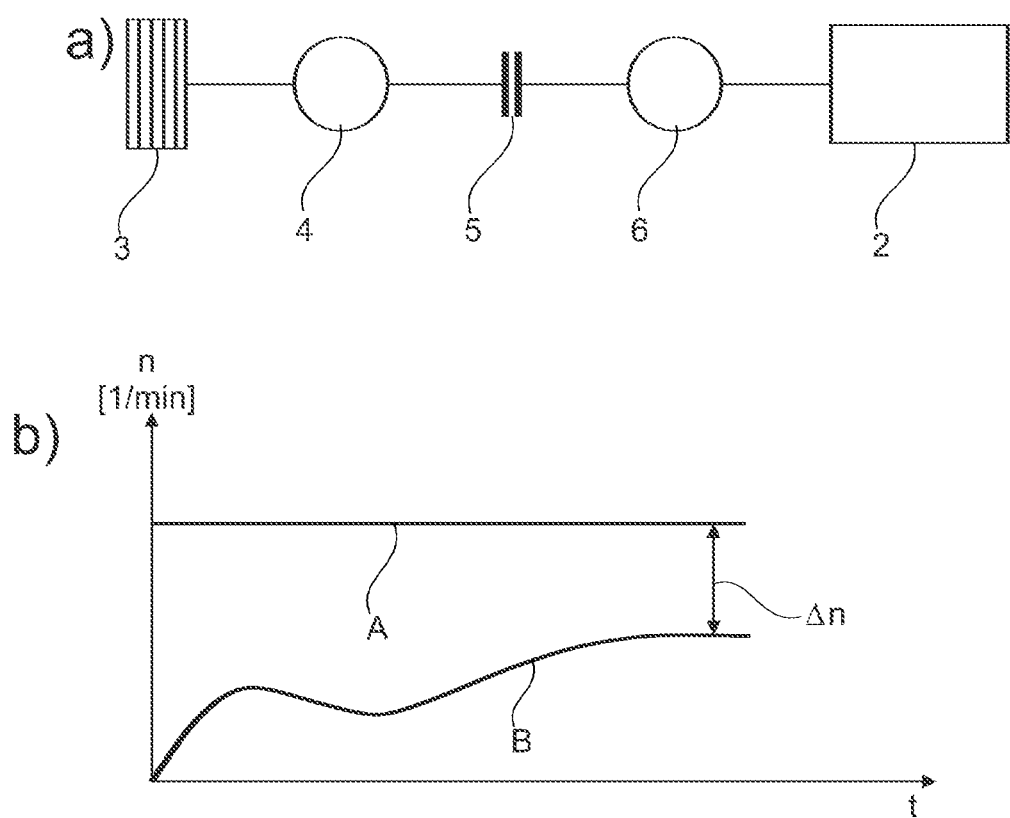
FIG. 2 shows a further exemplary embodiment of the actuation of the powertrain according to FIG. 1 with the opened hybrid disconnect clutch.

In FIG. 2, an exemplary embodiment of the method is shown in which, as shown in FIG. 2a, the hybrid disconnect clutch 5 is opened. The hybrid vehicle described in FIG. 1 is electrically driven by the first electric motor 4 while driving. The hybrid disconnect clutch 5 is open. The second electric motor 6 and the internal combustion engine 2 are operated at a constant rotational speed, the second electric motor 6 being controlled via a rotational speed control. The rotational speed difference Δn that forms between the first electric motor 4 and the second electric motor 6/internal combustion engine 2 must be sufficiently large to drag the unfired internal combustion engine 2 along via the second electric motor 6. At the same time, the rotational speed difference Δn is used to detect a change in torque at the second electric motor 6.

This sequence is shown in FIG. 2b, where the rotational speed n of the two electric motors 4, 6 is shown over the time t. Curve A shows the constant rotational speed $n_{EM2, V}$ of the second electric motor 6 and the internal combustion engine 2, while curve B shows the rotational speed $n_{EM1}$ of the first electric motor 4. After a predefined time t, there is a differential rotational speed Δn, which can be both positive and negative, between these two speeds $n_{EM1}$, $n_{EM2, V}$. Such a differential speed Δn is necessary in order to build up the clutch torque on the hybrid disconnect clutch 5.

Figure 3:
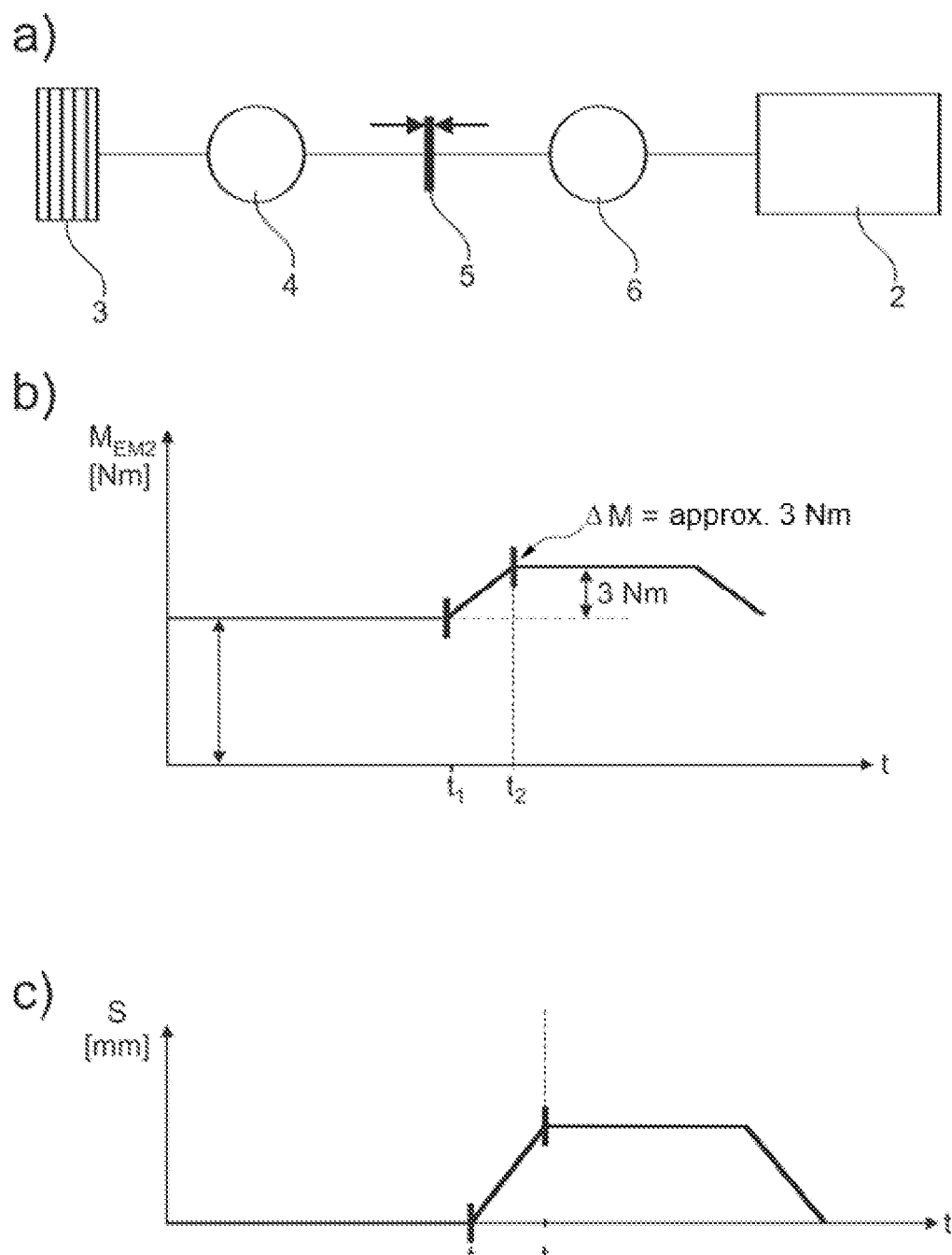
FIG. 3 shows an exemplary embodiment of the actuation of the powertrain according to FIG. 1 with the closed hybrid disconnect clutch.

In FIG. 3a, an exemplary embodiment of the method is shown in which the hybrid disconnect clutch 5 is closed from the open position up to the biting point. The diagram shown in FIG. 3b shows a torque $M_{EM2}$ of the second electric motor 6, which is monitored as a load by the position control, over time t. FIG. 3c shows the position of the hybrid disconnect clutch 5 over time t. The timelines of the two diagrams run parallel.

According to FIG. 3b, in a first time segment, a torque $M_{EM2}$ is required, which corresponds to the self-operation of the second electric motor 6 as well as the drag torque to be applied by the internal combustion engine 2. At time $t_1$, the hybrid disconnect clutch 5 is actuated in a ramp-shaped manner in the closing direction and achieves the biting point at time $t_2$. This is recognized by the rotational speed control, since the load, i.e., the torque $M_{EM2}$ of the second electric motor 6 has achieved a predefined load threshold value of, for example, 3 Nm. It is assumed that the hybrid disconnect clutch 5 begins to transmit a clutch torque and the biting point of the hybrid disconnect clutch 5 is achieved.

In FIG. 3c, during the ramp-shaped closing, the hybrid disconnect clutch 5 changes the position s of the hybrid disconnect clutch 5 in the period $t_1$-$t_2$, wherein the position s of the hybrid disconnect clutch 5 assumed at time $t_2$ corresponds to the biting point of the hybrid disconnect clutch 5. With this biting point, an internal clutch characteristic of the hybrid disconnect clutch is adapted, which is used as the basis for further operation of the hybrid disconnect clutch.

After determining the biting point, the hybrid disconnect clutch is opened again.

On the basis of the solution described, the biting point adaptation can be carried out at any time while the hybrid vehicle is driving and the clutch characteristic can be adapted with the operation of the hybrid disconnect clutch 5.

LIST OF REFERENCE SYMBOLS

1 Hybrid powertrain
2 Internal combustion engine
3 Output
4 First electric motor
5 Hybrid disconnect clutch
6 Second electric motor
7 Crankshaft
8 Rotor
9 Clutch input
10 Clutch output
11 Rotor
$n_{EM1}$ Rotational speed of the first electric motor
$n_{EM2,V}$ Rotational speed of the second electric motor/internal combustion engine
Δn Differential speed
$M_{EM2}$ Torque of the second electric motor
s Path of the clutch actuator
t Time

The invention claimed is:

1. A method for determining a biting point of a hybrid disconnect clutch of a hybrid vehicle, the hybrid disconnect clutch selectively coupling an internal combustion engine and a first electric motor, the first electric motor arranged on an output side, and a torque output by the internal combustion engine or the first electric motor is transferred to drive wheels of the hybrid vehicle, the method comprising moving the hybrid disconnect clutch from an open state into a closed state in order to determine the biting point, wherein a second electric motor, which is arranged on an internal combustion engine side and is rigidly connected to the internal combustion engine, is operated at a constant rotational speed during electric travel by means of the first electric motor, a load on the second electric motor being monitored while the hybrid disconnect clutch is moved from the open state to the closed state, it being detected that the biting point has been reached when the load on the second electric motor has reached a predefined load threshold value.

2. The method according to claim 1, wherein the internal combustion engine is unfired and is kept at the constant rotational speed by the second electric motor.

3. The method according to claim 2, wherein the constant rotational speed of the internal combustion engine and of the second electric motor is set by regulating a rotational speed of the second electric motor.

4. The method according to claim 1, wherein, in order to determine the biting point, a rotational speed difference between the first electric motor and the second electric motor is compared with a predefined rotational speed threshold.

5. The method according to claim 1, wherein a torque of the second electric motor is monitored as a load.

6. The method according to claim 1, wherein the hybrid disconnect clutch is operated in a ramp-shaped manner in a closing direction.

7. The method according to claim 1, wherein the biting point is determined by a position of the hybrid disconnect clutch, at which the load on the second electric motor exceeds the predefined load threshold value.

8. A method for determining a biting point of a disconnect clutch of a hybrid vehicle, the method comprising:
    propelling the hybrid vehicle while the disconnect clutch is open using a first electric motor on an output side of the disconnect clutch;
    regulating a speed of a second electric motor on an input side of the disconnect clutch by varying a torque of the second electric motor;
    gradually closing the disconnect clutch while monitoring the torque on the second electric motor; and
    concluding that the biting point has been reached when the torque exceeds a predefined load threshold value.

9. The method of claim 8, wherein a position of an actuator of the disconnect clutch is gradually changed until the predefined load threshold value is reached, then maintained for a period of time, then gradually changed in an opposite direction until the disconnect clutch is fully open.

10. The method of claim 8 wherein an internal combustion engine is fixed to the second electric motor and the internal combustion engine is not fired throughout execution of the method.

11. The method of claim 8 wherein a speed difference between the first electric motor and the second electric motor is maintained less than a predefined maximum speed difference throughout execution of the method.

12. The method of claim 8 wherein the second electric motor is maintained at a faster speed than the first electric motor throughout execution of the method.

* * * * *